(12) United States Patent
Behnen (10) Patent No.: US 11,194,802 B2
(45) Date of Patent: Dec. 7, 2021

(54) GENERATING SQL QUERIES FROM DECLARATIVE QUERIES FOR SEMI-STRUCTURED DATA

(71) Applicant: INTERNATIONAL BUSINESS MACHINES CORPORATION, Armonk, NY (US)

(72) Inventor: Marion E. Behnen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/571,739

(22) Filed: Sep. 16, 2019

(65) Prior Publication Data

US 2020/0012644 A1    Jan. 9, 2020

Related U.S. Application Data

(63) Continuation of application No. 14/808,191, filed on Jul. 24, 2015, now abandoned.

(51) Int. Cl.
```
G06F 16/00      (2019.01)
G06F 16/2453    (2019.01)
G06F 16/2452    (2019.01)
G06F 16/28      (2019.01)
```
(52) U.S. Cl.
CPC .... *G06F 16/24534* (2019.01); *G06F 16/2452* (2019.01); *G06F 16/284* (2019.01)

(58) Field of Classification Search
None
See application file for complete search history.

(56) References Cited

U.S. PATENT DOCUMENTS

| | | | |
|---|---|---|---|
| 6,282,537 B1 | 8/2001 | Madnick | |
| 6,449,620 B1 * | 9/2002 | Draper | G06F 16/258 |
| 6,847,962 B1 | 1/2005 | Cochrane | |
| 7,146,356 B2 | 12/2006 | Choi | |
| 7,167,848 B2 * | 1/2007 | Boukouvalas | G06F 40/143 |
| | | | 706/14 |
| 7,487,142 B2 | 2/2009 | Cohen | |
| 8,090,735 B2 | 1/2012 | Bireley | |
| 8,321,833 B2 | 11/2012 | Langworthy | |
| 8,396,901 B2 | 3/2013 | Schnelle | |
| 8,732,213 B2 * | 5/2014 | Sowell | G06F 16/901 |
| | | | 707/809 |

(Continued)

OTHER PUBLICATIONS

IBM, Appendix P, List of IBM Patents or Patent Applications Treated as Related, dated Sep. 16, 2019, 2 pages.

(Continued)

*Primary Examiner* — Jean M Corrielus
(74) *Attorney, Agent, or Firm* — William H. Hartwell (57) ABSTRACT

A method for generating database queries from declarative queries having a known syntax. The method includes a query preparation software receiving a declarative query in a known system form. The query preparation software then analyzes the declarative query to build a set of generic query tasks with identified data types. The query preparation software then optimizes the set of generic query tasks and builds a target database query from the optimized generic query tasks reflecting features of a target database. The method further includes the query preparation software submitting the target database query to the target database.

18 Claims, 4 Drawing Sheets

(56) References Cited

U.S. PATENT DOCUMENTS

| | | |
|---|---|---|
| 8,972,433 B2 | 3/2015 | Mclean |
| 9,275,099 B1 | 3/2016 | Kennedy, Jr. |
| 2003/0167261 A1 | 9/2003 | Grust |
| 2003/0177137 A1 | 9/2003 | Macleod |
| 2004/0267760 A1 | 12/2004 | Brundage |
| 2009/0024570 A1 | 1/2009 | Yoaz |
| 2009/0276394 A1 | 11/2009 | Bestgen |
| 2010/0088672 A1 | 4/2010 | Langworthy |
| 2010/0299327 A1 | 11/2010 | Kiefer |
| 2011/0113054 A1 | 5/2011 | Mclean |
| 2011/0295909 A1 | 12/2011 | Cotner |
| 2013/0054630 A1 | 2/2013 | Briggs |
| 2013/0117326 A1 | 5/2013 | De Smet |
| 2015/0081668 A1 | 3/2015 | Sankaranarayanan |
| 2015/0088924 A1 | 3/2015 | Abadi |
| 2015/0154259 A1* | 6/2015 | Keeton ............... G06F 16/2282 707/769 |
| 2015/0186462 A1* | 7/2015 | Crone ................. G06F 16/2453 707/716 |
| 2015/0254330 A1 | 9/2015 | Chan |
| 2015/0317361 A1* | 11/2015 | Battaglia ............... G06F 16/951 707/718 |
| 2016/0117364 A1 | 4/2016 | Jahankhani |
| 2016/0147832 A1* | 5/2016 | Sankaranarayanan ...................... G06F 16/2393 707/717 |
| 2016/0267122 A1 | 9/2016 | Kennedy, Jr. |
| 2017/0024432 A1 | 1/2017 | Behnen |
| 2017/0024434 A1 | 1/2017 | Behnen |
| 2017/0124140 A1 | 5/2017 | Kennedy, Jr. |

OTHER PUBLICATIONS

"Accessing Relational Data From A Rdbms From A NoSQL API", An IP.com Prior Art Database Technical Disclosure, Authors et. al.: Disclosed Anonymously, IP.com No. 000235450, IP.com Electronic Publication: Feb. 28, 2014, 6 pages.

IBM, "DB2 Cancun Release 10.5.0.4 (also known as Fix Pack 4) for Linux, UNIX, and Windows", <http://www-01.ibm.com/support/docview.wss?uid=swg24038261>, Signature: 10.5.0.4, Build level: s140813, Release Date: Aug. 29, 2014, pp. 1-9, Grace Period Disclosure.

* cited by examiner

FIG. 1

```
db.aggregate.cities(
{"$group":{"_id":{"state":"$state","city":"$city"},
        "sumpop":{"$sum":"pop"}}}
{"$sort":{"sumpop":1}}
{"$group":{"_id":"$_id.state",
        "smallestCity":{"$first":"$_id.city"},
        "smallestPop":{"$first":"$sumpop"},
        "biggestCity":{"$last":"$_id.city"},
        "biggestPop":{"$last":"$sumpop"}}}
)
```
— 202
— 204
— 206
— 208

FIG. 2A

```
SELECT  "_id.state" AS "_id",
        MIN(DECODE(RANK_ASC, 1,"_id.city")) AS "smallestCity",
        MIN(DECODE(RANK_ASC, 1,"sumpop")) AS "smallestPop",
        MIN(DECODE(RANK_DESC, 1,"_id.city")) AS "biggestCity",
        MIN(DECODE(RANK_DESC, 1,"sumpop")) AS "biggestPop"
FROM
  ( SELECT  "_id.state" AS "_id.state", "_id.city" AS "_id.city",
        "sumpop" AS "sumpop",
        RANK() OVER (PARTITION BY "_id.state" ORDER BY "sumpop" ) AS
RANK_ASC, RANK() OVER (PARTITION BY "_id.state"  ORDER BY "sumpop" DESC )
AS RANK_DESC
    FROM
  ( SELECT   JSON_VAL(DATA, 'state', 's:2048:na') AS "_id.state",
        JSON_VAL(DATA, 'city', 's:2048:na') AS "_id.city",
        SUM( JSON_VAL(DATA, 'pop', 'f:na')) AS "sumpop"
    FROM "TEST"."cities" t0
  GROUP BY   JSON_VAL(DATA, 'state', 's:2048:na'), JSON_VAL(DATA,
'city', 's:2048:na')
    ORDER BY "sumpop" ASC
  ) AS T1
  ) AS T2
GROUP BY  "_id.state"
ORDER BY "_id" ASC
```
— 210
212 —
214 —
216 —
218 —
220 —
222 —

GENERATING SQL QUERIES FROM DECLARATIVE QUERIES FOR SEMI-STRUCTURED DATA

STATEMENT REGARDING PRIOR DISCLOSURES BY THE INVENTOR

The following disclosure(s) is submitted under 35 U.S.C. 102(b)(1)(A):
(i) DB2 Cancun Release 10.5.0.4 (also known as Fix Pack 4) for Linux, UNIX, and Windows, IBM, Build level s140813, Aug. 29, 2014.

BACKGROUND

The present invention relates generally to the field of data queries, and more particularly to generating structured query language (SQL) queries from declarative queries for semi-structured data.

SQL is a special-purpose programming language designed for managing data held in a relational database management system (RDBMS), or for stream processing in a relational data stream management system (RDSMS). SQL includes a data definition language and a data manipulation language. The scope of SQL includes data insert, query, update and delete, schema creation and modification, and data access control. A relational database is a database that stores information about data and how it is related in a flat two-dimensional table called a relation. An RDBMS is software used to control reading, writing, modifying, and processing the information stored in the databases. The data are formally described and organized according to each database's relational model or database schema, according to the design.

JavaScript Object Notation (JSON) is an open standard data exchange format that is increasingly used not only to exchange data between applications, but also to store data schema-less in a database. JSON documents include combinations of name-value pairs where values might be single values, a list of values, or other name-value pair. JSON documents may be gathered into collections of related documents, however, JSON documents can be stored schema-less, thus even documents that belong to the same collection may differ in the attributes for which values are present in a particular document.

SUMMARY

Embodiments of the present invention disclose a method, computer program product, and system for generating database queries from declarative queries having a known syntax. The method includes receiving a declarative query in a known system form. The method then analyzes the declarative query to build a set of generic query tasks with identified data types. The method then optimizes the set of generic query tasks and builds a target database query from the optimized generic query tasks reflecting features of a target database. The method further includes submitting the target database query to the target database.

DETAILED DESCRIPTION

Embodiments in accordance with the present invention recognize that due to the requirement of having to specify the table structure in advance, storing JSON documents in a relational database is usually done by treating the JSON document as a unit. For example, a specific row of a dedicated column contains the totality of the JSON document. A conventional approach for providing access to such data is to use a wrapper that allows specifying a SQL query to retrieve the desired documents. In data mining, a wrapper is a program that extracts content of a particular information source and translates it into a relational form.

However, application developers and document managers may not be familiar with relational query languages like SQL. Often applications that are associated with such semi-structured data and flexible schemata are therefore expressed in descriptive query languages in a JSON-oriented format. Such languages may provide the ability to express complex queries by using a step-wise refinement on intermediate result sets to produce aggregated data. Alternatively, full-text search systems may be used to provide access to the documents. Such systems are easy to use to specify a query, but do not provide the capabilities of an RDBMS to aggregate and combine data and thus significantly limit the application use cases. In software and systems engineering, a use case is a list of steps, typically defining interactions between a role, also referred to as an "actor" in Unified Modeling Language (UML), and a system, to achieve a goal. The actor may be a human, an external system, or time.

Embodiments of the present invention address these shortcomings and allow users to continue to use a descriptive query language to specify data aggregations on semi-structured documents and continue to use the power of well-established RDBMS query optimization and query execution by translating descriptive queries into SQL queries that are attuned to the capabilities of the RDBMS.

Figure 1:
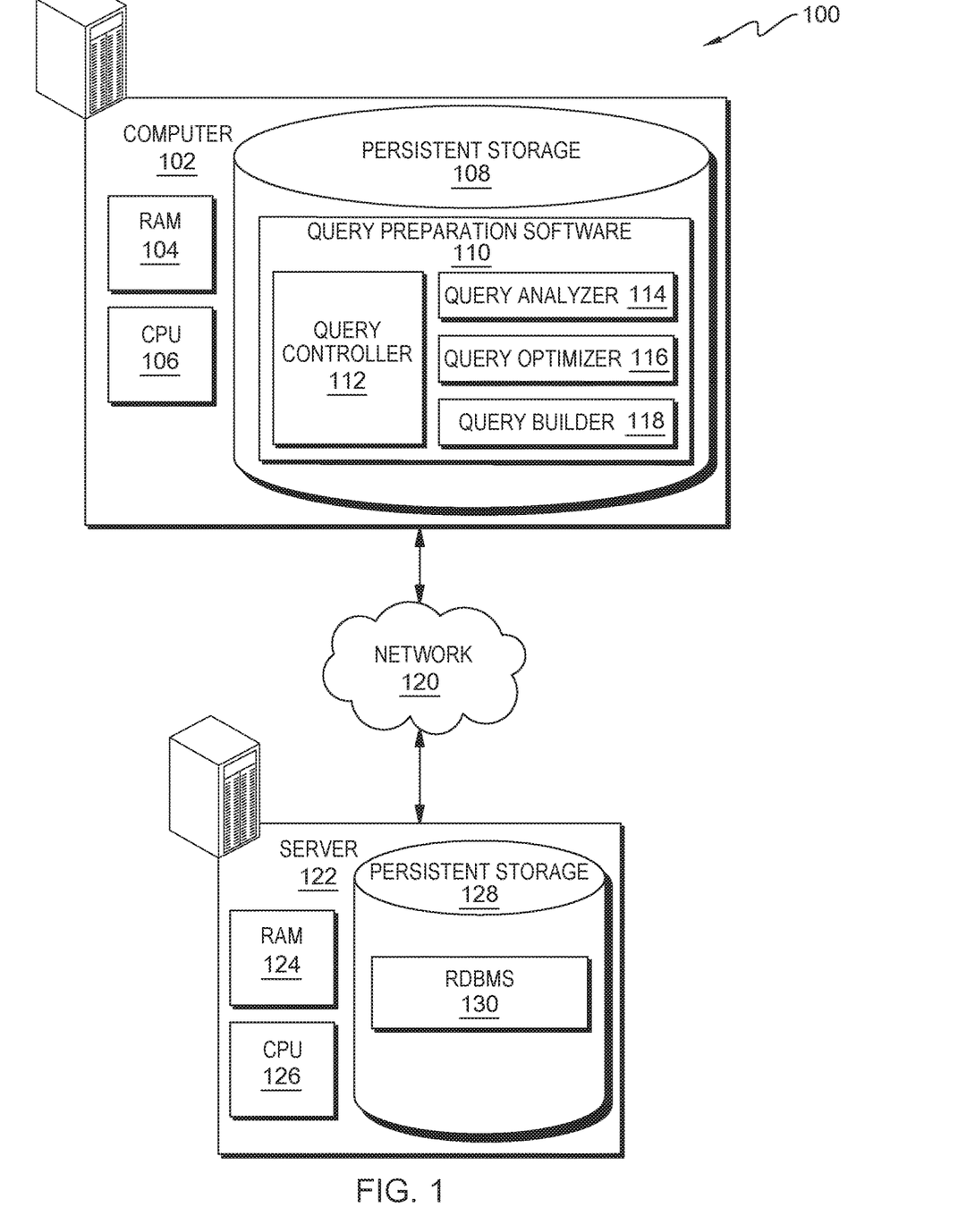
FIG. 1 is a functional block diagram illustrating a distributed data processing environment, in an embodiment in accordance with the present invention.

Embodiments in accordance with the present invention will now be described in detail with reference to the Figures. FIG. 1 is a functional block diagram, generally designated 100, illustrating a distributed data processing environment, in an embodiment in accordance with the present invention.

Distributed data processing environment 100 includes computer 102 and server 122, all interconnected over network 120. Computer 102 includes random access memory (RAM) 104, central processing unit (CPU) 106, and persistent storage 108. Computer 102 may be a Web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over a data connection to network 120. In other embodiments, computer 102 may represent server computing systems utilizing multiple computers as a server system, such as in a distributed computing environment. In general, computer 102 is representative of any electronic devices or combinations of electronic devices capable of executing machine-readable program instructions and communicating with server 122 via network 120 and with various components and devices within analytics data processing environment 100.

Computer 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Query preparation software 110 is stored in persistent storage 108, which also includes operating system software, as well as software that enables computer 102 to communicate with server 122, as well as other computing devices over a data connection on network 120. Query preparation software 110 includes query controller 112, query analyzer 114, query optimizer 116, and query builder 118. In one example embodiment, query preparation software 110 may include one or more query analyzers, and one or more combinations of query optimizers and query builders, which are adjusted through a query controller. Query controller 112 allows the adjusting of specific features, or properties, depending on their support in the targeted DBMS, and enables customization of the query generation depending on user preferences. Stated another way, query controller 112 provides a user with an interface for adjusting specific features and/or properties in order to customize generation of the target database query. For example, a controller setting may enforce that the identifier (i.e., primary key) of a document is always included in a result set even if the source-query does not explicitly contain it. Another example of a query controller 112 option is whether to use data samples in order to identify data types, and the size of the data samples. Query optimizer 116 provides a final validation of mappings between fields in the set of JSON query statements to attributes in the generated language-independent query tasks, also referred to as gqTasks, and assigning one or more data types to attributes in the generated query tasks.

A declarative query may include one or more tasks (dqTasks) that describe a desired set of documents. A dqTask may determine the scope of documents that should be included in the set of resulting documents, for example, by specifying a set of conditions that the documents need to match or by skipping a number of documents. A dqTask may also specify which fields or attributes to include or exclude from a source document and which functions to apply to generate a result document. Query analyzer 114 analyzes each dqTask, identifies the specified attributes and functions, and converts the dqTasks into generic query tasks (gqTask). By providing dedicated query analyzers, the query optimizer and query builder components can be used for a variety of declarative query languages such as MongoDB, JAQL, JSONiq, and JsonPath. (Note: the term(s) "MongoDB", "JAQL", "JSONiq" and/or "JsonPath" may be subject to trademark rights in various jurisdictions throughout the world and are used here only in reference to the products or services properly denominated by the marks to the extent that such trademark rights may exist.)

Query optimizer 116 is included in query preparation software 110. Query optimizer 116 takes the gqTasks as input and produces optimized SQL compatible tasks (sqTasks) based on the dqTask characteristics. In some embodiments, query optimizer 116 performs actions selected from a group comprising adding tasks, re-arranging tasks, and combining subsets of tasks. Query builder 118 is also included in query preparation software 110. The Query Builder uses the sqTasks and re-writes them into SQL clauses that are combined into an executable SQL statement. By using dedicated query builders, different functionality in various RDBMS releases may be taken into account.

Figure 4:
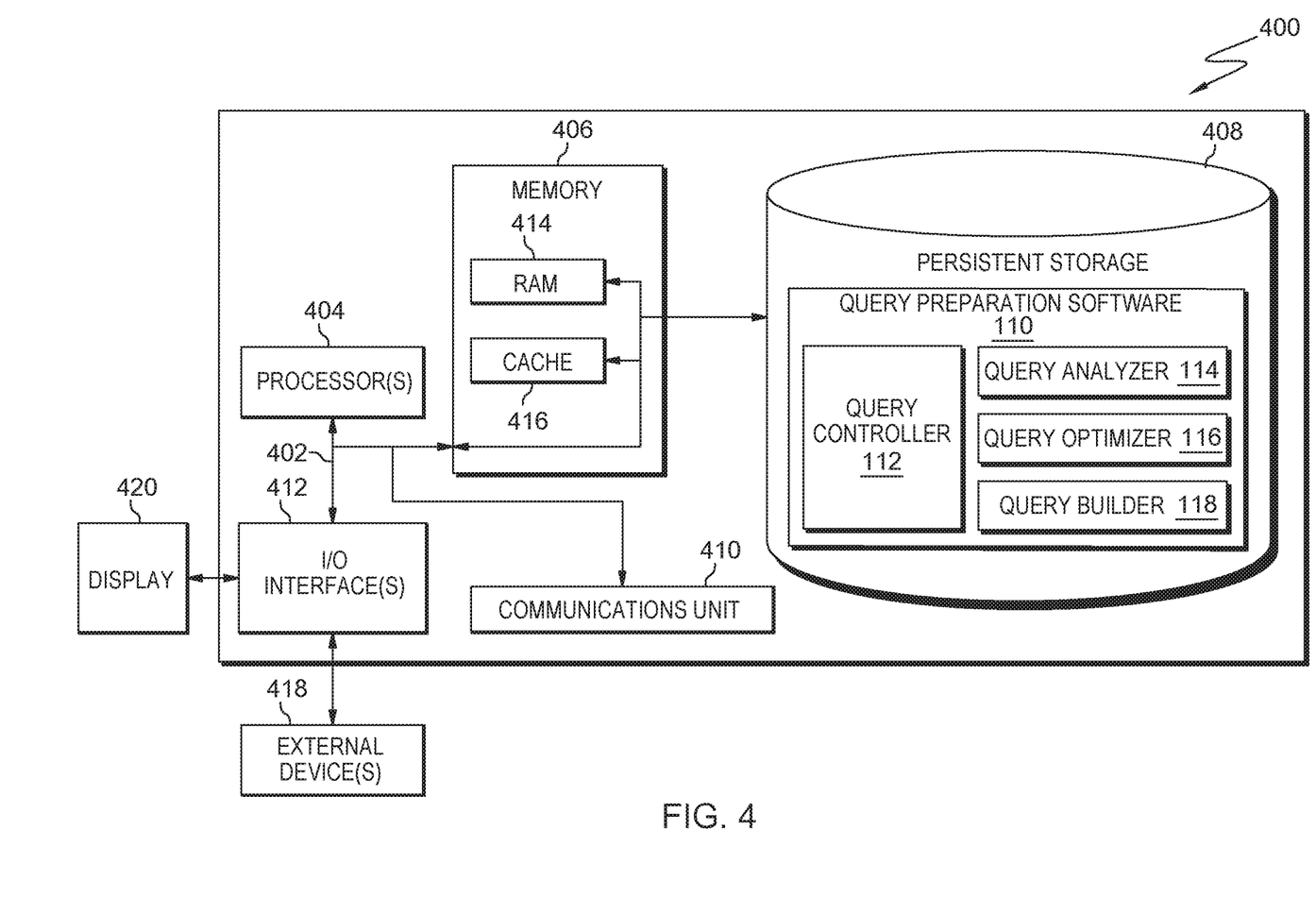
FIG. 4 depicts a block diagram of components of the client computer executing the query preparation program, in an embodiment in accordance with the present invention.

Computer 102 may include internal and external hardware components, as depicted and described in further detail with respect to FIG. 4.

In FIG. 1, network 120 is shown as the interconnecting fabric between computer 102, and server 122. In practice, network 120 may be any viable data transport network. Network 120 can be, for example, a local area network (LAN), a wide area network (WAN) such as the Internet, or a combination of the two, and can include wired, wireless, or fiber optic connections. In general, network 120 can be any combination of connections and protocols that will support communications between computer 102, and server 122 in accordance with an embodiment of the invention.

Distributed data processing environment 100 includes server 122. Server 122 includes RAM 124, CPU 126, and persistent storage 128. In various embodiments of the present invention, server 122 can respectively be a laptop computer, tablet computer, netbook computer, personal computer (PC), a desktop computer, a personal digital assistant (PDA), a smart phone, or any programmable electronic device capable of communicating with computer 102 via network 120. In the example embodiment of FIG. 1, server 122 includes persistent storage 128.

Persistent storage 128 may, for example, be a hard disk drive. Alternatively, or in addition to a magnetic hard disk drive, persistent storage 128 may include solid state hard drives, semiconductor storage devices, read-only memory (ROM), erasable programmable read-only memory (EPROM), flash memory, or any other computer-readable storage medium that are capable of storing program instructions or digital information. Persistent storage 128 also contains operating system software, as well as software that enables server 122 to communicate with computer 102, as well as other computing devices of distributed data processing environment 100 over a data connection on network 120.

Persistent storage 128 includes relational database management system (RDBMS) 130. RDBMS 130, also referred to as targeted RDBMS 130, resides on server 122 and allows for accessing, storing, updating, and deleting data in a relational database (not shown). RDBMS 130 may display one or more tables, or portions of one or more tables, and may receive user input through a user interface or remote application, such as query analyzer 114, query optimizer 116, and query builder 118, on computer 102 over network 120.

Figure 2A:
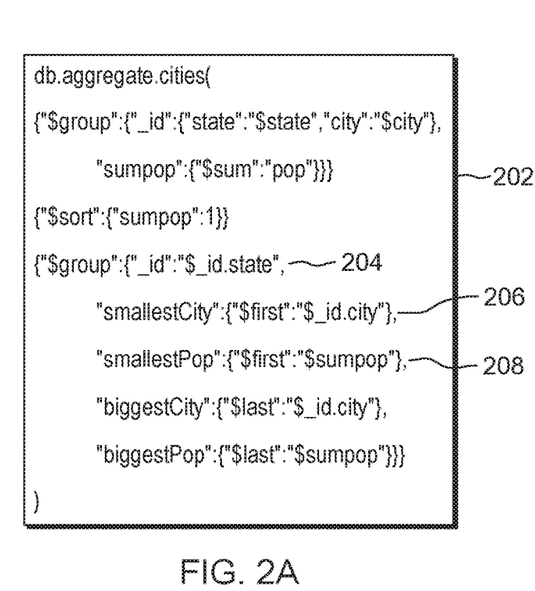
FIG. 2A is an example database query, on a computer within the data processing environment of FIG. 1, inputted into a query preparation program, in an embodiment in accordance with the present invention.

FIG. 2A is an example database query, on a computer within the data processing environment of FIG. 1, inputted into a query preparation program, in an embodiment in accordance with the present invention. In an example embodiment, a user submits a JSON-like query (i.e., a dqTask) to query preparation software 110 to find the smallest and biggest city per state from documents that contain population per city and zip code in RDBMS 130, as depicted in query portion 202 of FIG. 2A. Query analyzer 114 analyzes each dqTask, identifies the specified attributes and functions, and converts the dqTasks into sets of properties called gqTasks that describe what the query is about, and which are independent of the query-language. In other words, each gqTask is a set of properties which describe a part of the source query, in particular fields, keys, and certain control properties including, for example, selector, groupkeys, dissolvekeys, sortkeys, hasSortOnElement, isSortAfter, isLimitAfter, prepareOffset, needRank, needInClause, etc. In FIG. 2A, the dqTasks are '$group', '$sort', and '$group'. Examples of gqTask properties can be seen in the following (Code Snippet 1):

```
Code Snippet 1 - gcTask properties private int limit__ = 0;
private DBObject projectObj = null;
private ArrayList<DBFieldInfo> groupKeys__ = new
    ArrayList<DBFieldInfo>( );
private ArrayList<DBFieldInfo> dissolveArrayKey = null;
private boolean prepareOffset = false;
private String firstOpField__ = null;
private boolean needRank = false;
private boolean isSortAfter = false;
private boolean needSortAdapt = false;
private boolean isCustomID = false;
private boolean hasSortOnElement = false;
private boolean needRowInSelect = false;
private boolean putSkipInClause__ = false;
```

The gqTask properties include various integers, Boolean strings, array lists and pointers to objects. Some attributes may be set as part of the analysis. For example, the properties isCustomId, isSortAfter, and/or putSkipInClause may be set. Others may only be set during optimization, like the needSortAdapt, hasSortOnElement or needRank properties. Some properties may initially be set by the analyzer, but may be updated by the optimizer, such as needRowInSelect or prepareOffset. Each gqTask is then checked and, if necessary, adjusted to ensure it is semantically valid. This includes ensuring that tasks that occur at a later stage only use attributes that are included in the results from earlier tasks. Query analyzer 114 also determines whether the properties generated in the analysis of a specific dqTask can be combined with the properties of the current gqTask, or if a new gqTask is required. New gqTasks are produced if a dqTask changes the document base in an intermediate result set or switches between aggregated and non-aggregated document attributes. For example, if a task specifies a selection of attributes, it can be combined with a task that limits the number of documents, or with a task that declares sort attributes. However, a task that defines a limit and a task that specifies a group must be kept in the initial sequence as the result set will differ depending on the sequence.

After the analysis phase is complete, query optimizer 116 may first review the gqTasks to identify data types of the document attributes. Attributes in a schema-less document may be missing or may be of different data types. However, the target RDBMS (i.e., RDBMS 130) may require a data type specification to retrieve attributes from the schema-less document. Depending on query controller 112 settings, query optimizer 116 may therefore review the gqTasks and assign a target data type to the query attributes either based on sampling or on query values and specified functions. Sampling includes retrieving a specified number of documents and determine the data types of the existing attributes. Alternatively, query-based data type associations are based on the use of attributes in conditions and default data type assignments associated with functions. For example, typically functions like average, sum, or certain statistical functions are associated with numeric data types. Examples of identifying data types can be seen in the following JSON-oriented query:

```
Code Snippet 2 - JSON data types db.orders.aggregate({$group {{__id: region},sumsales: {$sum:
    {sales:1}})
```

In Code Snippet 2, the attributes 'sales' is tagged as a numeric value, because the sum-function is used on 'sales', and the attribute 'region' is tagged as a string value as default.

In the example database query of FIG. 2A, the attribute 'pop' is assigned a numeric data type, and the attributes 'state' and 'city' are assigned alpha-numeric data types. The data types are propagated to any attributes that are derived from the specified source attributes in subsequent gqTasks. The type association then proceeds with a "backward pass" to apply data types that have been identified in later tasks, and reconcile mismatches. Precedence is assigned to the more specific data type. Stated another way, numeric data types may have precedence over alpha-numeric types. In FIG. 2A, '$sumpop' 208 is identified as numeric because it is derived from attribute $pop, on which the $sum function is applied. '$id.state' 204 and '$id.city' 206 are assigned a string data type by default.

Query optimizer 116 then proceeds to examine the gqTasks to identify the mapping into SQL-compatible sqTasks. This can include further splitting or combining gqTasks, and identification of elements that require special handling in query builder 118. For example, to skip a number of documents, RDBMS 130 may first generate a row number as part of a temporary result set, and then apply a condition to only include rows with a row number greater than the specified offset. In such a case query optimizer 116 splits the gqTask task into two sqTasks.

Query optimizer 116 may also insert sqTasks as a means to implement functionality that requires generating an additional intermediate result step to allow applying a RDBMS function. For example, if the declarative query specifies a calculation of a standard deviation on elements of an array, query optimizer 116 may introduce a sqTask to extract the array elements, if the RDBMS function does not accept a structured object as input.

Query optimizer 116 may also combine multiple gqTasks into a single sqTask, for example, if incoming tasks contain a LIMIT (in SQL applied as a 'fetch first n rows only') and/or a SORT (in SQL applied as an 'order by') operation. In SQL, a LIMIT statement is used to retrieve records from one or more tables in a database and limit the number of records returned based on a limit value. If such incoming tasks are adjunct, a single sqTask may be sufficient to produce the result without the need to generate a separate SQL sub-select. Adjunct tasks refers to a task that can be combined with another task, usually because the sequence with its predecessor doesn't matter. For example, match-project or limit-project will produce the same (intermediate) resultset as project-match or project-limit, so the two can be combined. However, the 'limit' as incoming task is still essential to the query. An example when the sequence matters is a query with match-limit versus limit-match, those will produce different resultsets, a limit-match therefore cannot be combined. As a simple example for a task combination, if each step in a declarative query sequence were mapped into a sub-select, a sequence that uses limit and match could be represented with the following SQL templates:

---
Code Snippet 3 - SQL templates
---
1) select [fields]* from (select [fields]* from [table] fetch first n rows only) where [predicate]*
2) select [fields]* from (select [fields]* from [table] where [predicate]*) fetch first n rows only
Simplified #2
2) select [fields]* from [table] where [predicate]* fetch first n rows only
---

In Code Snippet 3, the second task can also be simplified to eliminate a SELECT and thus allows combining the tasks (as shown in "SIMPLIFIED #2). With each task split, insert, or combination, query optimizer 116 adjusts attribute names as necessary to keep target attribute names of preceding tasks and source attribute names of subsequent tasks synchronized. As part of the gqTask review, the query optimizer 116 may also add attributes into field selections to account for the capabilities of the field-retrieval mechanisms in the RDBMS. For example, if RDBMS 130 cannot access elements of structured objects, including arrays, in an intermediate result set, then if such a structured object is referenced in a gqTask, and a sub-structure or elements from the structured object are used in a subsequent task, then the element or sub-structure must be explicitly included into the intermediate result set. In the following sample query, query optimizer 116 selects an array named 'published' and sorts on the second element in the array. For targeted RDBMS 130, this may require adding an explicit field selection on the second element to produce a valid SQL statement, as seen in the following (Code Snippet 4) example:

---
Code Snippet 4 - Adding field selections
---
db.books.aggregate({"$project":{"author":1,"published":1}}, {"$sort":{"published.2":1}})
sqTask1: selector1(with author, published, published.2), sortkey(published.2)
sqTask2: selector2 (with author, published)
SELECT   "author" AS "author", "published" AS "published"
FROM
    ( SELECT JSON_VAL(DATA, 'author', 's:2048:na') AS "author",
           CAST(SYSTOOLS.JSON_BINARY2(DATA, 'published', 2048) AS
VARCHAR(2048) FOR BIT DATA) AS "published",
           JSON_VAL(DATA, 'published.2', 'i:na') AS
           "published.2"
      FROM "TEST"."books" t0
      ORDER BY "published.2" ASC
    ) AS T1
---

The field element list in the sqTask must include published.2 so that query builder 118 may produce a statement for the targeted DBMS (i.e., RDBMS 130).

After query optimizer 116 finishes generating and adjusting the sqTasks, query builder 118 maps the generic attribute and function assignments into an appropriate SQL statement. This mapping has two main aspects, one is to generate the query structure, and the other is to generate the field selection. For the field selection, DBMS-specific function assignments are associated with the declarative function specifications. Query builder 118 validates the function arguments and then uses the function assignments to generate the SQL that produces the field content. The function mappings may use a simple substitution or allow a recursive use to generate the field content. For example, a DBMS function may be applied recursively, if the number of arguments exceeds the number of DBMS function arguments. Also, arithmetic functions can be augmented with null handling to account for restrictions in the DBMS, as shown in Code Snippet 5:

---
Code Snippet 5 - Recursive function
---
db.furniture.aggregate({"$project":{"city_state":{"$concat":["$city"," ",",","$state"]}}})
SELECT CONCAT( JSON_VAL(DATA, 'city', 's:2048:na'),
CONCAT(', ',
JSON_VAL(DATA, 'state', 's:2048:na') )) AS "city_state" FROM "TEST"."furniture" t0
---

---
Code Snippet 6 - Null handling for arithmetic functions
---
db.furniture.aggregate({"$project":"color":1,"sales":"$sales","qty": "$qty","salesDIVqty":{"$div":["$sales","$qty"]}}})
sqTask: selector
SELECT   JSON_VAL(DATA, 'color', 's:2048:na') AS "color",
         JSON_VAL(DATA, 'sales', 'f:na') AS "sales",
         JSON_VAL(DATA, 'qty', 'f:na') AS "qty",
         CASE WHEN JSON_VAL(DATA, 'qty', 'f:na') = 0 THEN
              NULL
         ELSE DIV( JSON_VAL(DATA, 'sales', 'f:na'),
                   JSON_VAL(DATA, 'qty', 'f:na'))
         END AS "salesDIVqty"
   FROM "TEST"."furniture" t0
---

In the above example (Code Snippet 6), a NULL value is set if 'JSON VAL(DATA, 'gty', 'f:na') results in a value of zero. To produce a valid SQL query structure, each field-producing sqTask results in a SELECT clause. If a field-producing task is followed by another field-producing task, the previous SELECT clause is embedded as a sub-select. Depending on the supported options in query controller 112, query builder 118 may also generate temporary table statements (such as "WITH" statements). Each group-key definition produces a GROUP BY clause, each sort-key definition produces an ORDER BY clause, and each conditional task produces a WHERE clause. For example, a declarative query such as the following (Code Snippet 7) produces a sub-select to account for the need to assign row numbers to determine the offset, and a sub-select to group the data before the descending sort is applied:

---
Code Snippet 7 - Sub-select
---
db.aggregate.furniture({"$group":{"_id":{"type":"$type","color":"$color NoCase"},"countavg":{"$avg":"$count"}}},{"$skip":2},
{"$sort":{"_id.color":-1}},
{"$project":{"type":"$_id.type","color":"$_id.color",
"proavg":"$countavg"}})
----------------------------------
sqTask1: selector1, groupkeys
sqTask2: selector2, prepareOffset
sqTask3: selector2, offset
sqTask4: selector3, sortkeys
----------------------------------
SELECT "_id.type" AS "type", "_id.color" AS "color", "countavg" AS "proavg"
FROM
( SELECT "_id.type" AS "_id.type", "_id.color" AS "_id.color",
         "countavg" AS "countavg"
---

Code Snippet 7 - Sub-select

```
FROM
 ( SELECT "__id.type" AS "__id.type", "__id.color" AS "__id.color",
       "countavg" AS "countavg"
   FROM
    ( SELECT "__id.type" AS "__id.type",
          "__id.color" AS "__id.color",
          "countavg" AS "countavg" , ROW__NUMBER( ) OVER (
          ) AS RN
      FROM
       ( SELECT JSON__VAL(DATA, 'type', 'f:na') AS "__id.type",
             JSON__VAL(DATA, 'colorNoCase' , 's:2048:na') AS
"__id.color",
             AVG( JSON__VAL(DATA, 'count', 'f:na')) AS
             "countavg"
         FROM "TEST"."furniture" t0
         GROUP BY JSON__VAL(DATA, 'type', 'f:na'),
             JSON__VAL(DATA, 'colorNoCase', 's:2048:na')
       ) AS T1
    ) AS T2
    WHERE ( RN > 2)
  ) AS T3
  ORDER BY "__id.color" DESC
)
```

Finally, the generated queries are submitted to the RDBMS and executed in the same manner as custom-written SQL. The result set is then returned to the user after being formatted into the appropriate data exchange format.

Figure 2B:
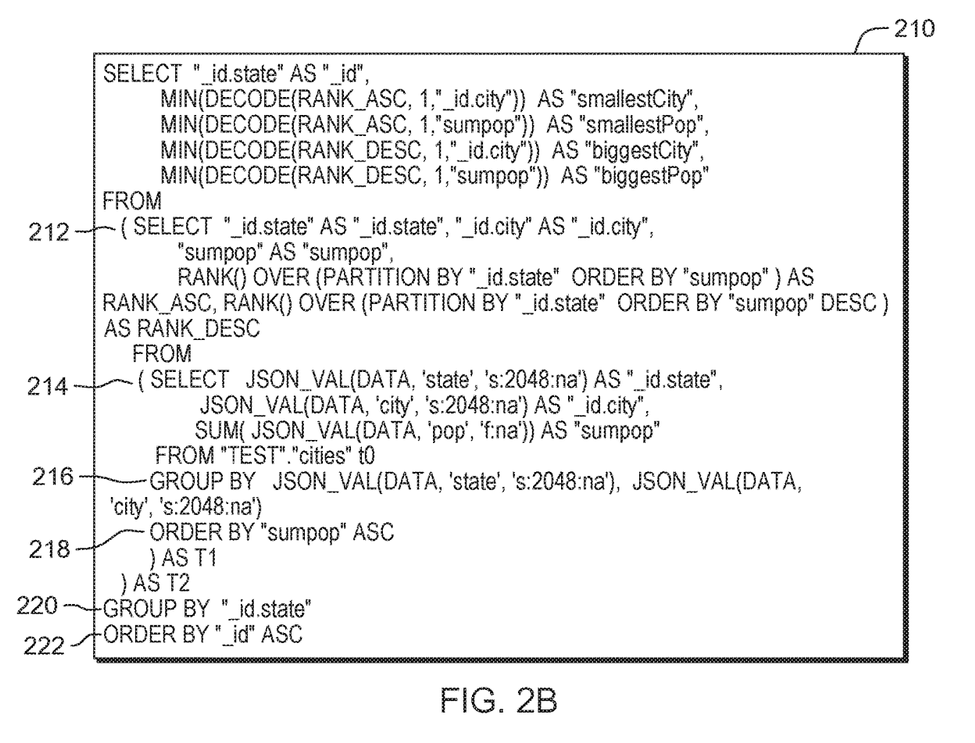
FIG. 2B is an example of an executable SQL statement, on a client computer within the data processing environment of FIG. 1, combined from SQL clauses from the converted database query, in an embodiment in accordance with the present invention.

FIG. 2B is an example of an executable SQL statement, generally designated 210, on a client computer within the data processing environment of FIG. 1, combined from SQL clauses from the converted database query, in an embodiment in accordance with the present invention. Statement 210 includes SELECT clauses, indicated by reference numbers 212 and 214, where SELECT clause 214 is a sub-select clause. The GROUP BY clauses indicate the defined group-key definitions as indicated by reference numbers 216 and 220. The ORDER BY clauses indicate the defined sort-key definitions as indicated by reference numbers 218 and 222. The final generated executable SQL statement is sent to RDBMS 130 and the results are returned to the user.

Figure 3:
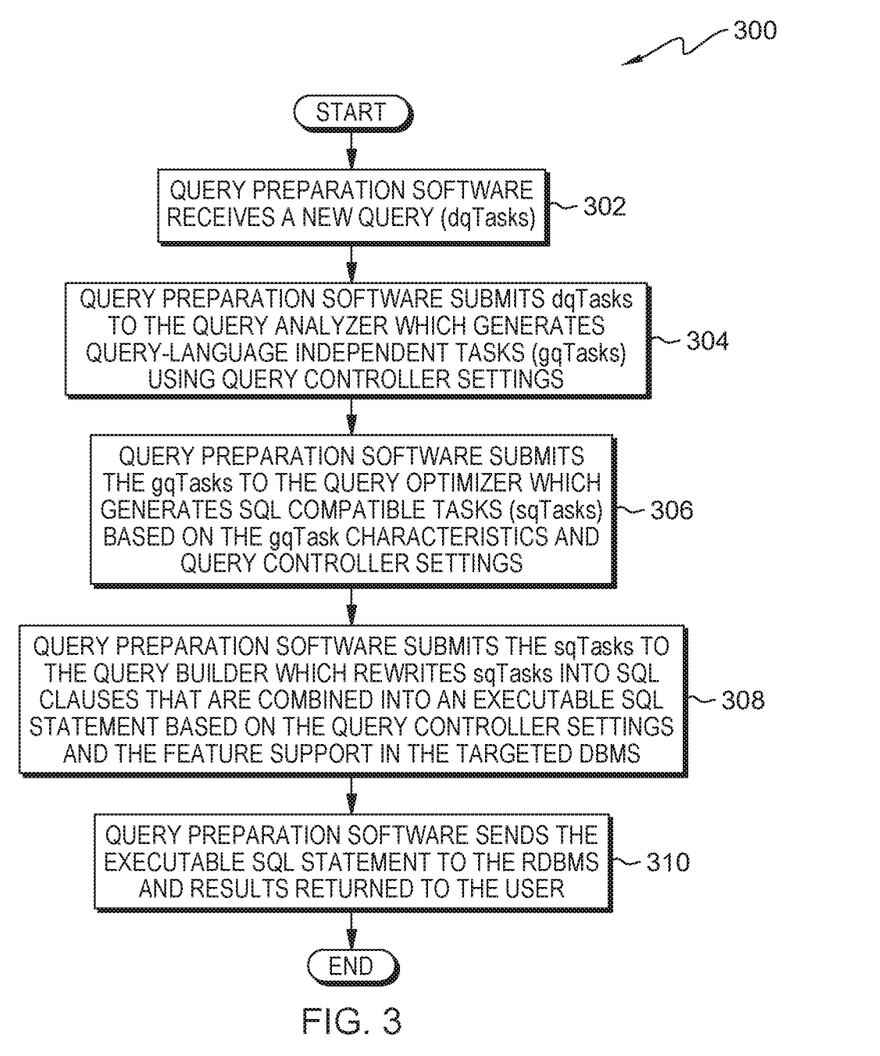
FIG. 3 is a flowchart depicting the operational steps of a query preparation program, translating descriptive queries into executable SQL statements on a client computer within the data processing environment of FIG. 1, in an embodiment in accordance with the present invention.

FIG. 3 is a flowchart depicting the operational steps of a query preparation program, translating descriptive queries into executable SQL statements on a client computer within the data processing environment of FIG. 1, in an embodiment in accordance with the present invention. In an example embodiment, query preparation software 110 receives a new query including one or more dqTasks as depicted in step 302. In another example embodiment, the new queries may be received directly by query analyzer 114. In other example embodiments, the new query may be sent to query preparation software 110 using any declarative query language.

In step 304, query preparation software 110 submits dqTasks to query analyzer 114 which generates query-language independent tasks (gqTasks) using query controller 112 settings. Query analyzer 114 loops through all of the source tasks in the incoming query to generate the gqTasks. An example of this can be seen in the following example (Code Snippet 8) query analyzer 114 code:

Code Snippet 8 - Generating dqTasks

```
if project
   if currentTask hasSelector or needsDissolvedArray
       store task and generate new task as currentTask
```

Code Snippet 8 - Generating dqTasks

```
   endif
   set selector in currentTask
elseif sort
   if currentTask hasLimit or hasOffset or needsDissolvedArray
       store task and generate new task as currentTask
   endif
   set sort in currentTask
```

Query preparation software 110 submits the gqTasks to query optimizer 116 which generates SQL compatible tasks (sqTasks) based on the gqTask characteristics and query controller 112 settings as depicted in step 306. Query optimizer 116 generates the sqTasks by first determining the data types in the gqTasks. In one example embodiment, where a JSON schema is used for the gqTask, query optimizer 116 will assign data types from the JSON schema to the attributes in the gqTask. If no JSON schema is available and query controller 112 is configured to sample the data types, query optimizer 116 will sample the data to determine the data types. If no JSON schema is available and query controller 112 is configured to parse the query for the data types, query optimizer 116 will parse the query to determine the data types.

Query optimizer 116 then reviews the tasks to ensure all attributes required in a task are available, and propagate the attributes backwards, if necessary. One example of reviewing tasks by query optimizer 116 includes determining if a sortkey is missing in preceding selections and, where the sortkey is missing, propagating the sortkey backwards into selectors. A sortkey is a field, or fields, in a record that dictate the sequence of the documents in a result set. For example, the sortkeys "CITY" and "NAME" arrange the documents alphabetically by name within city, where "CITY" is the major sort key, and "NAME" is the minor key.

Query optimizer 116 then adds, or combines, tasks and makes them SQL compatible. Some examples of adding/combining tasks are: (i) if pivot required, add task to prepare a pivot; (ii) if sort applied on an array element, which is not in the selector, add element to the selector to retrieve the element; (iii) if no selector and an array needs to be dissolved, add task to add the array element as selector; (iv) if an attribute is included in a task, but not referenced in subsequent tasks, remove the attribute; (v) if two selector tasks are not separated by a task that changes the number of documents in the result set by grouping or dissolving an array, merge tasks (for example, project-limit-project, or project-offset-limit-project); and (vi) if two tasks to dissolve arrays are not separated by a task with a limit or offset, merge tasks. In any case, if tasks are added or combined, adjust source/target field designations. In other example embodiments, query optimizer 116 may receive the gqTasks directly from query analyzer 114.

In step 308, query preparation software 110 submits the sqTasks to query builder 118 which rewrites sqTasks into SQL clauses that are combined into an executable SQL statement based on query controller 112 settings and the feature support in the targeted DBMS (i.e., RDBMS 130). In this example embodiment, query builder 118 loops through the sqTasks and builds clauses recursively by performing one or more of the following: (i) mapping functions on attributes to target functions; (ii) building select-clauses from selectors; (iii) building groupBy-clauses from groupKeys; (iv) building orderBy-clauses from sortKeys; (v) building where-clause from predicates; (vi) if hasLimit, build limit-clause; (vii) if hasOffset, build offset-clause; (viii) if hasdissolveArray, add table-function to from-clause; (ix) build executable query from all clauses; and/or (x) set executable query as from-clause. In other example embodiments, query preparation software may contain more than one query builder, where each query builder is dedicated to build target-specific queries from query tasks for different target systems. In other example embodiments, query builder 118 may receive the sqTaks directly from query optimizer 116.

Query preparation software 110 sends the executable SQL statement to RDBMS 130 and the results are returned to the user as depicted in step 310.

FIG. 4 depicts a block diagram of components of the client computer executing the query preparation program, in an embodiment in accordance with the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Query preparation software 110, query controller 112, query analyzer 114, query optimizer 116, and query builder 118 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of network 120 and client devices 104, 106, and 108. In these examples, communications unit 410 includes one or more network interface cards. Communications unit 410 may provide communications through the use of either or both physical and wireless communications links. Query preparation software 110, query controller 112, query analyzer 114, query optimizer 116, and query builder 118 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., query preparation software 110, query controller 112, query analyzer 114, query optimizer 116, and query builder 118, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  receiving, by one or more processors, a declarative query in a known system form, wherein the declarative query describes a desired set of documents;
  analyzing, by one or more processors, the declarative query to build an ordered set of generic query tasks, wherein generic query tasks of the set of generic query tasks include respective sets of properties which correspond to respective parts of the declarative query;
  optimizing, by one or more processors, the set of generic query tasks, wherein optimizing the set of generic query tasks includes: (i) adjusting generic query tasks of the set of generic query tasks to only use attributes that are included in results from generic query tasks of the set of generic query tasks that occur earlier in the order of the set of generic query tasks, (ii) determining generic query tasks of the set of generic query tasks that produce result sets that do not differ depending on the order of the respective generic query tasks, and (iii) combining at least two generic query tasks of the set of generic query tasks determined to produce result sets that do not differ depending on the order of the respective generic query tasks;
  building, by one or more processors, a target database query, from the optimized generic query tasks, reflecting features of a target database; and
  submitting, by one or more processors, the target database query to the target database.

2. The method of claim 1, wherein the declarative query in the known system form is a set of JavaScript Object Notation (JSON) query statements, and wherein the target database supports Structured Query Language (SQL) queries.

3. The method of claim 2, further comprising:
  providing, by one or more processors, a validation of mappings between fields in the set of JSON query statements to properties of the generic query tasks; and
  assigning, by one or more processors, one or more data types to attributes in the generated query tasks.

4. The method of claim 1, further comprising:
  providing, by one or more processors, a user with an interface for adjusting specific properties in order to customize generation of the target database query.

5. The method of claim 1, further comprising:
  receiving, by one or more processors, results from the target database query; and formatting, by one or more processors, the received results into the known system form.

6. The method of claim 5, further comprising:

returning, by one or more processors, the formatted results.

7. A computer program product comprising:

one or more computer readable storage media and program instructions stored on the one or more computer readable storage media, the stored program instructions comprising:

program instructions to receive a declarative query in a known system form, wherein the declarative query describes a desired set of documents;

program instructions to analyze the declarative query to build an ordered set of generic query tasks, wherein generic query tasks of the set of generic query tasks include respective sets of properties which correspond to respective parts of the declarative query;

program instructions to optimize the set of generic query tasks, wherein the program instructions to optimize the set of generic query tasks include: (i) program instructions to adjust generic query tasks of the set of generic query tasks to only use attributes that are included in results from generic query tasks of the set of generic query tasks that occur earlier in the order of the set of generic query tasks, (ii) program instructions to determine generic query tasks of the set of generic query tasks that produce result sets that do not differ depending on the order of the respective generic query tasks, and (iii) program instructions to combine at least two generic query tasks of the set of generic query tasks determined to produce result sets that do not differ depending on the order of the respective generic query tasks;

program instructions to build a target database query, from the optimized generic query tasks, reflecting features of a target database; and program instructions to submit the target database query to the target database.

8. The computer program product of claim 7, wherein the declarative query in the known system form is a set of JavaScript Object Notation (JSON) query statements, and wherein the target database supports Structured Query Language (SQL) queries.

9. The computer program product of claim 8, the stored program instructions further comprising:

program instructions to provide a validation of mappings between fields in the set of JSON query statements to properties of the generic query tasks; and program instructions to assign one or more data types to attributes in the generated query tasks.

10. The computer program product of claim 7, the stored program instructions further comprising:

program instructions to provide a user with an interface for adjusting specific properties in order to customize generation of the target database query.

11. The computer program product of claim 7, the stored program instructions further comprising:

program instructions to receive results from the target database query; and program instructions to format the received results into the known system form.

12. The computer program product of claim 11, the stored program instructions further comprising:

program instructions to return the formatted results.

13. A computer system comprising:

one or more computer processors;

one or more computer readable storage media;

program instructions stored on the computer readable storage media for execution by at least one of the one or more processors, the stored program instructions comprising:

program instructions to receive a declarative query in a known system form, wherein the declarative query describes a desired set of documents;

program instructions to analyze the declarative query to build an ordered set of generic query tasks, wherein generic query tasks of the set of generic query tasks include respective sets of properties which correspond to respective parts of the declarative query;

program instructions to optimize the set of generic query tasks, wherein the program instructions to optimize the set of generic query tasks include: (i) program instructions to adjust generic query tasks of the set of generic query tasks to only use attributes that are included in results from generic query tasks of the set of generic query tasks that occur earlier in the order of the set of generic query tasks, (ii) program instructions to determine generic query tasks of the set of generic query tasks that produce result sets that do not differ depending on the order of the respective generic query tasks, and (iii) program instructions to combine at least two generic query tasks of the set of generic query tasks determined to produce result sets that do not differ depending on the order of the respective generic query tasks;

program instructions to build a target database query, from the optimized generic query tasks, reflecting features of a target database; and program instructions to submit the target database query to the target database.

14. The computer system of claim 13, wherein the declarative query in the known system form is a set of JavaScript Object Notation (JSON) query statements, and wherein the target database supports Structured Query Language (SQL) queries.

15. The computer system of claim 14, the stored program instructions further comprising:

program instructions to provide a validation of mappings between fields in the set of JSON query statements to properties of the generic query tasks; and program instructions to assign one or more data types to attributes in the generated query tasks.

16. The computer system of claim 13, the stored program instructions further comprising:

program instructions to provide a user with an interface for adjusting specific properties in order to customize generation of the target database query.

17. The computer system of claim 13, the stored program instructions further comprising:

program instructions to receive results from the target database query; and program instructions to format the received results into the known system form.

18. The computer system of claim 17, the stored program instructions further comprising:

program instructions to return the formatted results.

* * * * *